(12) United States Patent
Miyagi (10) Patent No.: US 10,706,342 B2
(45) Date of Patent: Jul. 7, 2020

(54) MARKING SYSTEM FOR MARKING AN OBJECT WITH IRRADIATED LIGHT

(71) Applicant: TOSHIBA TEC KABUSHIKI KAISHA, Shinagawa-ku, Tokyo (JP)

(72) Inventor: Daisuke Miyagi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/180,090

(22) Filed: Nov. 5, 2018

(65) Prior Publication Data

US 2019/0138865 A1 May 9, 2019

(30) Foreign Application Priority Data

Nov. 9, 2017 (JP) ................. 2017-216383

(51) Int. Cl.
*G06K 19/06* (2006.01)
*G06K 19/14* (2006.01)
*G06K 5/02* (2006.01)

(52) U.S. Cl.
CPC ......... *G06K 19/06028* (2013.01); *G06K 5/02* (2013.01); *G06K 19/14* (2013.01)

(58) Field of Classification Search
CPC .................................. G06K 19/06028
USPC ........................................... 235/494
See application file for complete search history.

(56) References Cited

U.S. PATENT DOCUMENTS

| 5,602,377 A * | 2/1997 | Beller ............... G06K 1/121 235/385 |
| 6,533,174 B2 | 3/2003 | Swartz |
| 7,108,183 B1 * | 9/2006 | Cox, Jr. ............. G06K 1/126 235/385 |
| 9,280,690 B2 | 3/2016 | Furukawa |
| 2013/0087050 A1 * | 4/2013 | Studor ............... A47J 31/521 99/285 |

* cited by examiner

*Primary Examiner* — Toan C Ly
(74) *Attorney, Agent, or Firm* — Amin, Turocy & Watson, LLP (57) ABSTRACT

In accordance with an embodiment, a marking apparatus comprises an acquiring section configured to acquire first information associated with an object; a setting section configured to set parameters of a laser beam based on the first information; and a marking section configured to irradiate the object with the laser beam based on the parameters set by the setting section to mark second information on the object.

20 Claims, 7 Drawing Sheets

MARKING SYSTEM FOR MARKING AN OBJECT WITH IRRADIATED LIGHT

CROSS-REFERENCE TO RELATED APPLICATION

This application is based upon and claims the benefit of priority from Japanese Patent Application No. 2017-216383, filed Nov. 9, 2017, the entire contents of which are incorporated herein by reference.

FIELD

Embodiments described herein relate generally to a marking apparatus and a marking system.

BACKGROUND

A laser marker to mark an object with a laser beam is known. However, it takes much time and labor to set the laser marker depending on an object, making operation cumbersome.

DETAILED DESCRIPTION

In accordance with an embodiment, a marking apparatus comprises an acquiring component configured to acquire first information associated with an object; a setting component configured to set parameters of a laser beam based on the first information; and a marking component configured to irradiate the object with the laser beam based on the parameters set by the setting component to mark second information on the object.

Hereinafter, a marking system according to several embodiments is described with reference to the accompanying drawings.

First Embodiment

Figure 1:
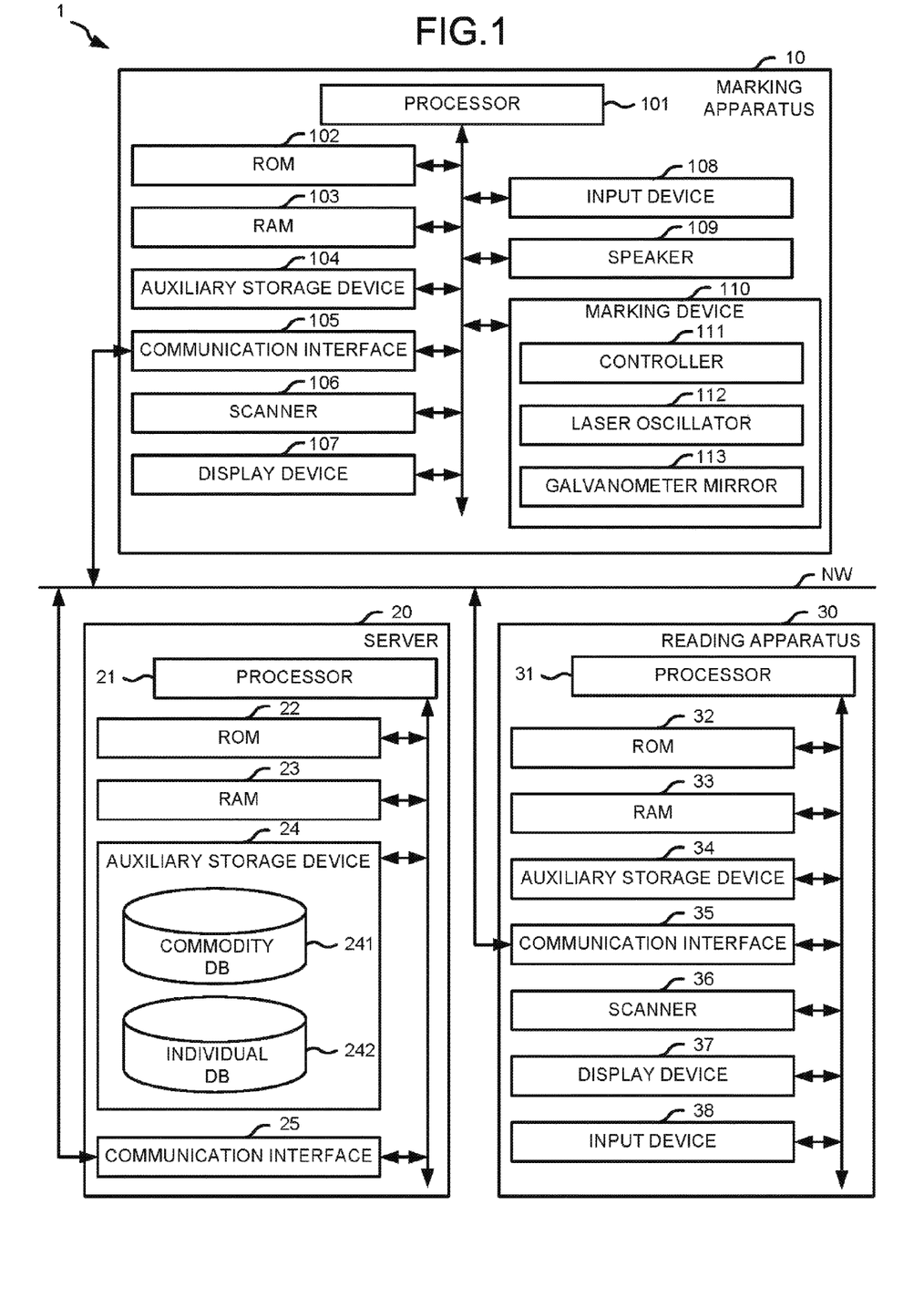
FIG. 1 is a block diagram illustrating an example of circuit configurations of main portions of a marking system and components contained in the marking system according to a first embodiment.

FIG. 1 is a block diagram illustrating an example of circuit configurations of main portions of a marking system 1 and components of the marking system 1 according to the first embodiment. For example, the marking system 1 includes a marking apparatus 10, a server 20 and a reading apparatus 30.

The marking apparatus 10, the server 20 and the reading apparatus 30 are connected to a network NW. For example, the network NW is the Internet. The network NW may be a private network such as an intranet. The network NW may be a WAN (Wide Area Network). The network NW may be a LAN (Local Area Network). The network NW may be a leased line, a public mobile phone network or the like.

The marking apparatus 10 has a function of reading information recorded in a barcode or the like. The marking apparatus 10 has a function of marking an object such as a commodity using a laser beam based on the read information. For example, the marking apparatus 10 may be a hand-held type device, or may be installed on a floor or a desk for use. For example, the marking apparatus 10 includes a processor 101, a ROM (Read-Only Memory) 102, a RAM (Random-Access Memory) 103, an auxiliary storage device 104, a communication interface 105, a scanner 106, a display device 107, an input device 108, a speaker 109 and a marking device 110.

The processor 101 acts as a central part of a computer which performs processing such as an arithmetic processing or a control processing necessary for the operation of the marking apparatus 10. The processor 101 executes programs such as system software, application software or a firmware stored in the ROM 102 or the auxiliary storage device 104 to control each section to realize various functions of the marking apparatus 10. The processor 101 is, for example, a CPU (Central Processing Unit), a MPU (Micro Processing Unit), a SoC (System on a Chip), a DSP (Digital Signal Processor), a GPU (Graphics Processing Unit), an ASIC (Application Specific Integrated Circuit), a PLD (Programmable Logic Device) or a FPGA (Field-Programmable Gate Array). Alternatively, the processor 101 may be a combination of these.

The ROM 102 acts as a main storage portion of the computer with the processor 101 as the central part. The ROM 102 is a read-only nonvolatile memory. The ROM 102 stores the above programs. The ROM 102 stores data used for the processor 101 to perform various processing or various setting values.

The RAM 103 acts as a main storage portion of the computer with the processor 101 as the central part. The RAM 103 is a memory used for reading and writing data. The RAM 103 is used as a so-called work area for storing data temporarily used by the processor 101 to perform various processing.

The auxiliary storage device 104 acts as an auxiliary storage device of the computer with the processor 101 as the central part. The auxiliary storage device 104 is, for example, an EEPROM (Electric Erasable Programmable Read-Only Memory), an HDD (Hard Disk Drive), an SSD (Solid State Drive), or the like. The auxiliary storage device 104 may store the above programs. The auxiliary storage device 104 stores data used by the processor 101 to perform various processing, data generated in a processing by the processor 101, or various setting values.

The programs stored in the ROM 102 or the auxiliary storage device 104 include a program for executing later-described processing. As an example, the marking apparatus 10 is accessed by an administrator of the marking apparatus 10 in a state in which the program is stored in the ROM 102 or the auxiliary storage device 104. However, the marking apparatus 10 may be accessed by the administrator in a state in which the program is not stored in the ROM 102 or the auxiliary storage device 104. The marking apparatus 10 may be accessed by the administrator with a program different from the program stored in the ROM 102 or the auxiliary storage device 104. The program for executing the processing described later may be transferred separately to the administrator and may be written into the ROM 102 or the auxiliary storage device 104 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network.

The communication interface 105 is an interface through which the marking apparatus 10 communicates via the network NW or the like.

The scanner 106 reads a barcode attached to a commodity or the like using an optical module, and outputs information such as a commodity code indicated by the barcode. The commodity code is, for example, a JAN (Japanese Article Number) code. The barcode may be a one-dimensional barcode or a two-dimensional barcode such as a QR Code®. The scanner 106 may be fixed to the marking apparatus 10 or may be externally attached to the marking apparatus 10. The scanner 106 externally attached is connected to the marking apparatus 10 in a wired or wireless manner. The scanner 106 may be a scanner of a laser system or a scanner of an image sensor system. Furthermore, the scanner 106 may be a camera.

The display device 107 displays a screen for notifying an operator of the marking apparatus 10 of various kinds of information. The display device 107 is, for example, a display such as a liquid crystal display or an organic EL (electroluminescence) display.

The input device 108 receives an operation input by the operator of the marking apparatus 10. The input device 108 is, for example, a keyboard, a keypad, a touch pad, a mouse, or the like. As the display device 107 and the input device 108, a touch panel may be used. Specifically, a display panel of the touch panel may be used as the display device 107, and a touch pad of the touch panel may be used as the input device 108.

The speaker 109 outputs an input sound signal as a sound wave.

The marking device 110 is a laser marker for marking an image on an object by irradiating an object such as a commodity with a laser beam. The image includes characters or symbols. The marking device 110 marks the object by changing appearance, for example, by scraping, peeling, burning, oxidizing, discoloring or melting the object with the laser beam. The marking device 110 includes, for example, a controller 111, a laser oscillator 112, a Galvanometer mirror 113, and the like. Under the control of the processor 101, the controller 111 controls the laser oscillator 112 and the Galvanometer mirror 113. The marking device 110 may include a plurality of types of laser oscillators 112. In this case, the marking apparatus 10 can selectively use plural types of laser beams. The laser beams of different types mean laser beams different from each other in medium or frequency.

The configuration of the marking device 110 is not limited to the above configuration, and may be the same as the configurations of various other known laser markers.

The marking device 110 is an example of a marking section.

For example, the server 20 stores commodity information, individual information, and the like. The server 20 transmits the commodity information, the individual information or the like in response to requests. The server 20 includes a processor 21, a ROM 22, a RAM 23, an auxiliary storage device 24, and a communication interface 25.

The processor 21 acts as a central part of a computer which performs processing such as an arithmetic processing or a control processing necessary for the operation of the server 20. The processor 21 executes programs such as system software, application software or a firmware stored in the ROM 22 or the auxiliary storage device 24 to control each section to realize various functions of the server 20. The processor 21 is, for example, a CPU, a MPU, a SoC, a DSP, a GPU, an ASIC, a PLD or a FPGA. Alternatively, the processor 21 may be a combination of these.

The ROM 22 acts as a main storage portion of the computer with the processor 21 as the central part. The ROM 22 is a read-only nonvolatile memory. The ROM 22 stores the above programs. The ROM 22 stores data used for the processor 21 to perform various processing or various setting values.

The RAM 23 acts as a main storage portion of the computer with the processor 21 as the central part. The RAM 23 is a memory used for reading and writing data. The RAM 23 is used as a so-called work area for storing data temporarily used by the processor 21 to perform various processing.

The auxiliary storage device 24 acts as an auxiliary storage device of the computer with the processor 21 as the central part. The auxiliary storage device 24 is, for example, an EEPROM, an HDD, an SSD, or the like. The auxiliary storage device 24 may store the above programs. The auxiliary storage device 24 stores data used by the processor 21 to perform various processing, data generated in the processing by the processor 21, or various setting values. The server 20 may include an interface into which a storage medium such as a memory card, a USB (Universal Serial Bus) memory or the like can be inserted in place of or in addition to the auxiliary storage device 24.

For example, the auxiliary storage device 24 stores a commodity DB (database) 241 and an individual DB 242.

The commodity DB 241 stores information relating to each commodity by type. For example, the commodity DB 241 stores a commodity code and commodity information of a commodity specified by the commodity code in an associated manner. The commodity information is information relating to the commodity specified by the commodity code. The commodity information includes, for example, a commodity name, a price, a stock quantity and marking information. Here, the marking information is used for determining settings relating to the laser beam emitted by the marking apparatus 10. The marking information includes, for example, parameters relating to the laser beam suitable for marking using the laser beam. For example, the marking information includes material information for determining parameters relating to the laser beam suitable for marking using the laser beam, such as a material and thickness of a surface of the commodity. Alternatively, the marking information includes information indicating that the marking using the laser beam cannot be performed, information indicating that the marking using the laser beam is prohibited, information indicating that the marking using the laser beam is not performed, and the like. The marking information is input in advance by a user or an administrator of the marking system 1, for example.

The commodity information is an example of first information associated with the commodity. The marking information is an example of the first information.

The individual DB 242 stores individual ID uniquely assigned to an individual commodity and individual information relating to the individual commodity specified by the individual ID in an associated manner. For example, the individual information may include description of a commodity, a trademark, a variety, a producing area, a producer, an administrator, an importer, a seller, a date of birth, a sex, a breeding place, a breeder, a fodder, a manufacturing factory, a harvesting date and time, a processing date and time, a date of manufacture, a shipping date and time, an export date and time, an import date and time, an arrival date and time, a selling store, a selling date and time, an expiration date, a freshness date and the like.

The programs stored in the ROM 22 or the auxiliary storage device 24 include a program for executing a later-described processing. For example, the server 20 is accessed by an administrator of the server 20 with the program stored in the ROM 22 or the auxiliary storage device 24. However, the server 20 may be accessed by the administrator in a state in which the program is not stored in the ROM 22 or the auxiliary storage device 24. The server 20 may be accessed by the administrator with another program different from the above program stored in the ROM 22 or the auxiliary storage device 24. Then, the program for executing the later-described processing may be separately transferred to the administrator, and may be written into the ROM 22 or the auxiliary storage device 24 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network NW.

The communication interface 25 is an interface through which the server 20 communicates via the network NW or the like.

The reading apparatus 30 has a function of reading information marked by the marking apparatus 10. The reading apparatus 30 is, for example, a POS (point of sale) terminal, an electronic cash register, a smartphone, a tablet PC (personal computer), or a PC. Here, the POS terminal is installed in a retail store for performing register jobs such as purchase registration of a commodity to be settled and checkout of the registered commodity. As an example, the POS terminal is mainly operated by a store clerk. However, the POS terminal may be a self-service type terminal operated by a customer or the like. The POS terminal may be a semi-self-type terminal including a registration apparatus for performing purchase registration of the commodity and a checkout apparatus for performing checkout processing on the registered commodity. Typically, in a semi-self-type POS terminal, the registration apparatus is operated by a store clerk, and the checkout apparatus is operated by a customer. The reading apparatus 30 includes a processor 31, a ROM 32, a RAM 33, an auxiliary storage device 34, a communication interface 35, a scanner 36, a display device 37, and an input device 38.

The processor 31 acts as a central part of a computer which performs processing such as an arithmetic processing or a control processing necessary for the operation of the reading apparatus 30. The processor 31 executes programs such as system software, application software or a firmware stored in the ROM 32 or the auxiliary storage device 34 to control each section to realize various functions of the reading apparatus 30. The processor 31 is, for example, a CPU, a MPU, a SoC, a DSP, a GPU, an ASIC, a PLD, or a FPGA. Alternatively, the processor 31 may be a combination of these. The processor 31 is an example of a processing section. The computer with the processor 31 as the central part is an example of the processing section.

The ROM 32 acts as a main storage portion of the computer with the processor 31 as the central part. The ROM 32 is a read-only nonvolatile memory. The ROM 32 stores the above programs. The ROM 32 stores data used for the processor 31 to perform various processing or various setting values.

The RAM 33 acts as a main storage portion of the computer with the processor 31 as the central part. The RAM 33 is a memory used for reading and writing data. The RAM 33 is used as a so-called work area for storing data temporarily used by the processor 31 to perform various processing.

The auxiliary storage device 34 acts as an auxiliary storage device of the computer with the processor 31 as the central part. The auxiliary storage device 34 is, for example, an EEPROM, an HDD, an SSD, or the like. The auxiliary storage device 34 may store the above programs. The auxiliary storage device 34 stores data used by the processor 31 to perform various processing, data generated in the processing by the processor 31, or various setting values. The reading apparatus 30 may include an interface into which a storage medium such as a memory card, a USB memory or the like can be inserted in place of or in addition to the auxiliary storage device 34.

The programs stored in the ROM 32 or the auxiliary storage device 34 include a program for executing a later-described processing. As an example, the reading apparatus 30 is accessed by an administrator of the reading apparatus 30 with the program stored in the ROM 32 or the auxiliary storage device 34. However, the reading apparatus 30 may be accessed by the administrator in a state in which the program is not stored in the ROM 32 or the auxiliary storage device 34. The reading apparatus 30 may be accessed by the administrator with another program different from the above program stored in the ROM 32 or the auxiliary storage device 34. Then, the program for executing the later-described processing may be separately transferred to the administrator, and may be written into the ROM 32 or the auxiliary storage device 34 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network NW.

The communication interface 35 is an interface through which the reading apparatus 30 communicates via the network NW or the like.

The scanner 36 reads and outputs the information marked by the marking apparatus 10. The scanner 36 reads a barcode attached to a commodity or the like, and outputs a commodity code indicated by the barcode. The scanner 36 may be fixed to the reading apparatus 30 or may be externally attached to the reading apparatus 30. The scanner 36 externally attached is connected to the reading apparatus 30 in a wired or wireless manner. The scanner 36 may be a scanner of a laser system or a scanner of an image sensor system. Furthermore, the scanner 36 may be a camera. The scanner 36 is an example of a reading section.

The display device 37 displays a screen for notifying an operator of the reading apparatus 30 of various kinds of information. The display device 37 is, for example, a display such as a liquid crystal display or an organic EL display.

The input device 38 receives an operation input by the operator of the reading apparatus 30. The input device 38 is, for example, a keyboard, a keypad, a touch pad, a mouse, or the like. As the display device 37 and the input device 38, a touch panel may be used. Specifically, a display panel of the touch panel may be used as the display device 37, and a touch pad of the touch panel may be used as the input device 38.

Figure 2:
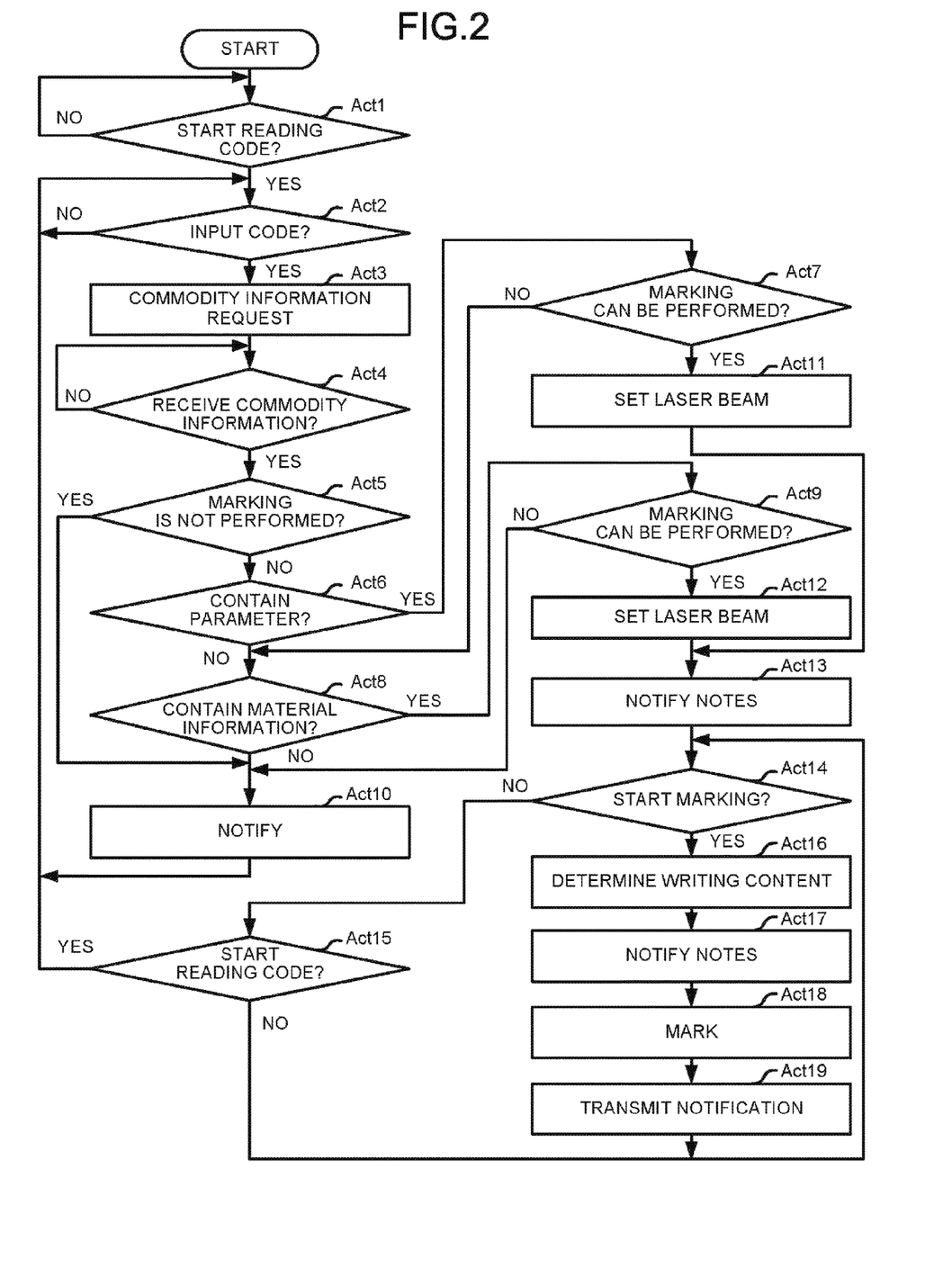
FIG. 2 is a flowchart depicting a processing executed by a processor of a marking apparatus in FIG. 1 according to the first embodiment.
Figure 3:
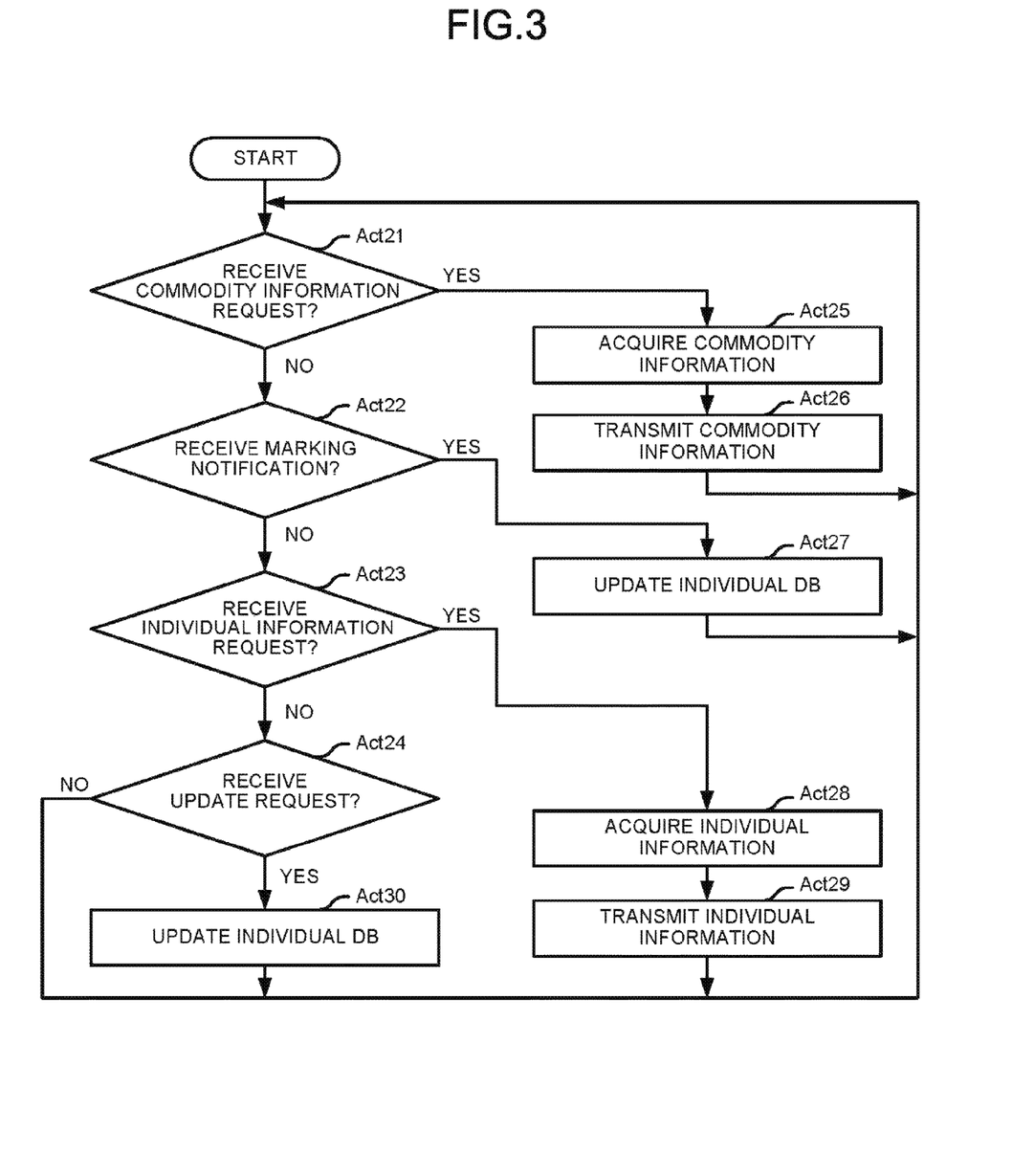
FIG. 3 is a flowchart depicting a processing executed by a processor of a server in FIG. 1 according to the first embodiment and a second embodiment.
Figure 4:
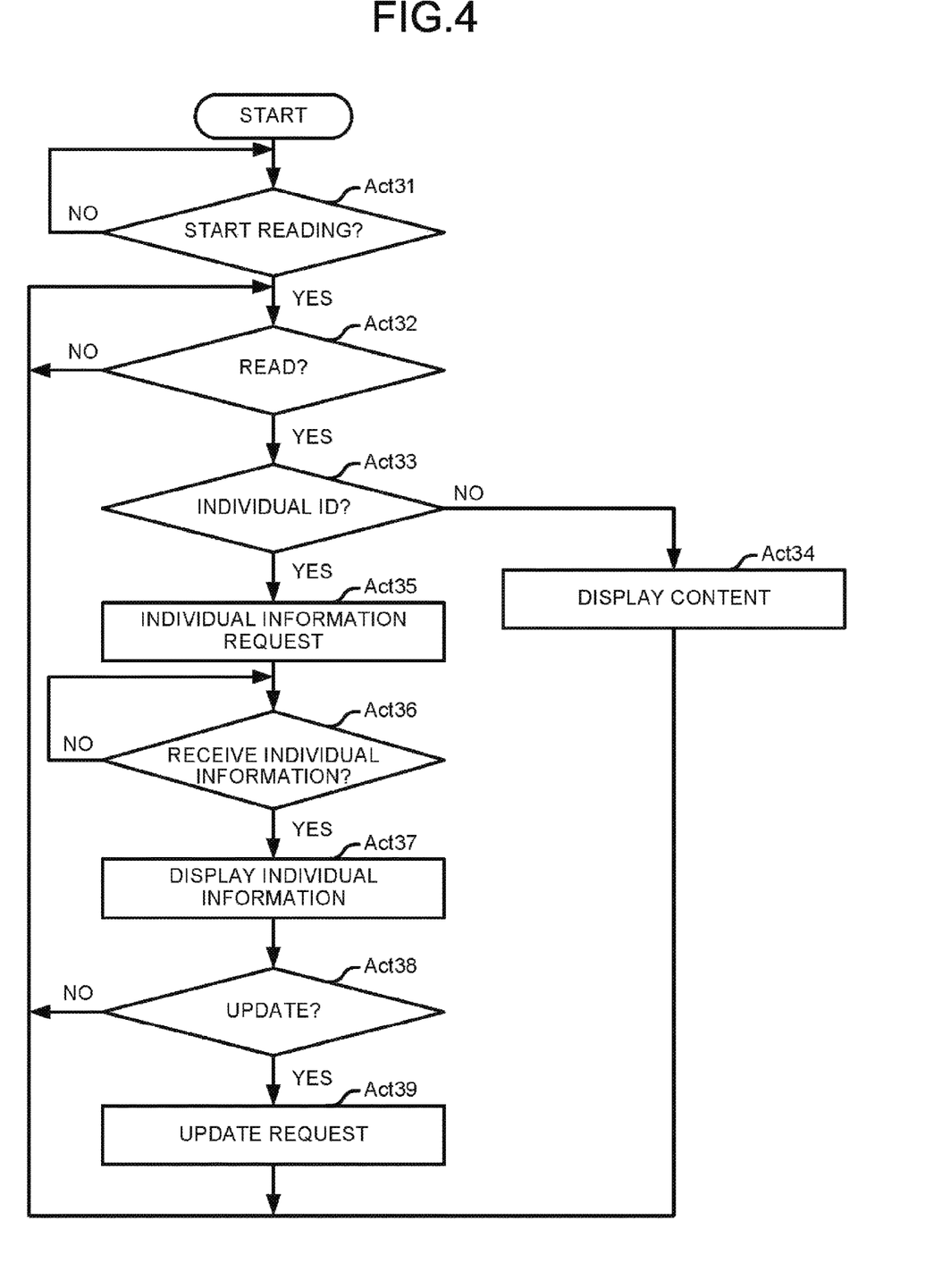
FIG. 4 is a flowchart depicting a processing executed by a processor of a reading apparatus in FIG. 1 according to the first embodiment.

The operation of the marking system 1 according to the first embodiment is described below with reference to FIG. 2 to FIG. 4. The content of the processing in the following operation description is merely an example, and various processing capable of achieving the same result can be suitably used. FIG. 2 is a flowchart depicting a processing executed by the processor 101 of the marking apparatus 10. The processor 101 executes the processing by executing the program stored in the ROM 102 or the auxiliary storage device 104. FIG. 3 is a flowchart depicting a processing executed by the processor 21 of the server 20. The processor 21 executes the processing by executing the program stored in the ROM 22 or the auxiliary storage device 24 or the like. FIG. 4 is a flowchart depicting a processing executed by the processor 31 of the reading apparatus 30. The processor 31 executes the processing by executing the program stored in the ROM 32 or the auxiliary storage device 34. Unless special description is provided, it is assumed that the processor 101, the processor 21 and the processor 31 proceed to the processing in Act (N+1) after processing in Act N (N is a natural number).

If the operator of the marking apparatus 10 wants to mark a commodity, the operator first operates the input device 108 to instruct the marking apparatus 10 to start reading a commodity code.

In Act 1 in FIG. 2, the processor 101 of the marking apparatus 10 stands by until an operation for instructing to start reading the commodity code is performed. If the operation for instructing to start reading the commodity code is performed, the processor 101 determines Yes in Act 1 and proceeds to the processing in Act 2.

In Act 2, the processor 101 stands by until the commodity code is input to the marking apparatus 10. For example, the commodity code is input as shown below. The operator of the marking apparatus 10 uses the scanner 106 to read a barcode attached to the commodity. Alternatively, the operator of the marking apparatus 10 may use the scanner 106 to read a barcode attached to a container such as a box for accommodating a plurality of commodities. For example, the container is called a carton that is mainly used at the time of distribution by accommodating a certain number of commodities. The barcode may be attached to a shelf on which the commodity is placed. By reading the barcode with the scanner 106, the commodity code recorded in the barcode is input to the marking apparatus 10. If the commodity code is input, the processor 101 determines Yes in Act 2 and proceeds to the processing in Act 3.

In Act 3, the processor 101 generates a commodity information request. The commodity information request includes the commodity code input in Act 2. The commodity information request requests transmission of the commodity information associated with the commodity code. After generating the commodity information request, the processor 101 controls the communication interface 105 to transmit the commodity information request to the server 20. Under the control of the processor 101, the communication interface 105 transmits the commodity information request to the server 20. The transmitted commodity information request is received by the communication interface 25 of the server 20.

Meanwhile, in Act 21 in FIG. 3, the processor 21 determines whether or not the commodity information request is received. If the commodity information request is not received, the processor 21 determines No in Act 21 and proceeds to the processing in Act 22.

In Act 22, the processor 21 determines whether or not a marking notification is received. If the marking notification is not received, the processor 21 determines No in Act 22 and proceeds to the processing in Act 23.

In Act 23, the processor 21 determines whether or not an individual information request is received. If the individual information request is not received, the processor 21 determines No in Act 23 and proceeds to the processing in Act 24.

In Act 24, the processor 21 determines whether or not an update request is received. If the update request is not received, the processor 21 determines No in Act 24 and returns to the processing in Act 21. Thus, the processor 21 repeats the processing in Act 21 to Act 24 until the commodity information request, the marking notification, the individual information request or the update request is received. The marking notification, the individual information request and the update request are described in detail later.

If the commodity information request is received in the standby state in Act 21 to Act 24, the processor 21 determines Yes in Act 21 and proceeds to the processing in Act 25.

In Act 25, the processor 21 refers to the commodity DB 241 to acquire the commodity information associated with the commodity code included in the commodity information request received in the standby state in Act 21 to Act 24.

In Act 26, the processor 21 controls the communication interface 25 to transmit the commodity information acquired in Act 25 to the marking apparatus 10. Under the control of the processor 21, the communication interface 25 transmits the commodity information to the marking apparatus 10. The transmitted commodity information is received by the communication interface 105 of the marking apparatus 10. After the processing in Act 26, the processor 21 returns to the processing in Act 21.

Meanwhile, in Act 4 in FIG. 2, the processor 101 of the marking apparatus 10 stands by until the commodity information is received by the communication interface 105. If the commodity information is received, the processor 101 determines Yes in Act 4 and proceeds to the processing in Act 5.

Through the processing in Act 3 and Act 4, the processor 101 acquires the commodity information. Therefore, by performing the processing in Act 3 and Act 4, the computer with the processor 101 as the central part and the communication interface 105 cooperate with each other to function as an acquiring section for acquiring the first information.

In Act 5, the processor 101 determines whether or not the marking is not performed based on the marking information included in the commodity information received in Act 4. If the marking information included in the commodity information received in Act 4 includes the information indicating that the marking using the laser beam cannot be performed or the information indicating that the marking using the laser beam is not performed, the processor 101 determines the marking is not performed. If the processor 101 does not determine that the marking is not performed, the processor 101 determines No in Act 5 and proceeds to the processing in Act 6.

By executing the processing in Act 5, the computer with the processor 101 as the central part functions as a control section that determines whether or not the marking is performed based on the first information.

In Act 6, the processor 101 determines whether or not the parameters relating to the laser beam are included in the marking information. If the parameters relating to the laser beam are included in the marking information, the processor 101 determines Yes in Act 6 and proceeds to the processing in Act 7.

By performing the processing in Act 6, the computer with the processor 101 as the central part functions as the control section that determines whether or not the marking is performed based on the first information.

In Act 7, the processor 101 determines whether or not the marking device 110 can normally mark the commodity with the laser beam that can be emitted (hereinafter referred to as "irradiation enabled laser beam") based on the parameters relating to the laser beam included in the marking information. The processor 101 determines whether or not the marking can be performed normally with the irradiation enabled laser beam as follows, for example. Specifically, when the parameters of the marking device 110 can be set to the parameters included in the marking information, the processor 101 determines that the marking can be normally performed. Contrarily, when the parameters of the marking device 110 cannot be set to the parameters included in the marking information, the processor 101 determines that the marking cannot be normally performed. This is because a range of the parameter that can be set differs depending on the performance of the marking device 110 or the like. The parameters relating to the laser beam include, for example, laser output. For example, the parameters relating to the laser beam may include a marking speed (irradiation time), a resolution of the image to be marked, a size of the image to be marked, the number of times of irradiation, a focal length, a type of the laser beam, a wavelength of the laser beam and the like. Among them, the type of the laser beam indicates a type of the laser beam to be used when the marking apparatus 10 has plural kinds of laser beams. Depending on the material of the object, there is a case in which it is preferable to mark the object by repeatedly irradiating the same location a large number of times. The number of times of repetition in that case is the number of times of irradiation. The marking information may include the parameters of the laser beam of plural patterns instead of the parameter of one pattern. In this case, if the parameters of the marking device 110 can be set to at least one pattern among the parameters of the plural patterns, the processor 101 determines that the marking can be normally performed. The parameter may be a numerical range. In this case, the processor 101 determines that the marking can be normally performed if the parameters of the marking device 110 can be set within the numerical range.

By executing the processing in Act 7, the computer with the processor 101 as the central part functions as the control section that determines whether or not the marking is performed based on the first information.

If it is determined that the marking cannot be normally performed, the processor 101 determines No in Act 7 and proceeds to the processing in Act 8. If the parameters relating to the laser beam are not included in the marking information, the processor 101 determines No in Act 6 and proceeds to the processing in Act 8.

In Act 8, the processor 101 determines whether or not the marking information includes the material information such as material and thickness of the surface of the commodity.

If the marking information includes the material information, the processor 101 determines Yes in Act 8 and proceeds to the processing in Act 9.

By executing the processing in Act 8, the computer with the processor 101 as the central part functions as a control section which determines whether or not the marking is performed based on the first information.

In Act 9, the processor 101 determines whether or not the commodity can be marked normally with an irradiation enabled laser beam based on the material information. The case in which the marking cannot be performed normally means that the commodity cannot be marked as the material of the surface of the commodity is difficult to absorb the irradiation enabled laser beam, or that a hole may be formed by irradiating the commodity with the irradiation enabled laser beam as the material of the surface of the commodity is too thin.

By performing the processing in Act 9, the computer with the processor 101 as the central part functions as the control section that determines whether or not the marking is performed based on the first information.

If it is determined that the marking cannot be normally performed, the processor 101 determines No in Act 9 and proceeds to the processing in Act 10. If it is determined that the marking is not performed in Act 5, the processor 101 determines Yes and proceeds to the processing in Act 10. If the marking information does not include the material information, the processor 101 determines No in Act 8 and proceeds to the processing in Act 10.

In Act 10, the processor 101 controls each section to notify that the marking is not performed or the marking cannot be performed. Specifically, the processor 101 controls the speaker 109 to output sound indicating that the marking is not performed or the marking cannot be performed. For example, the processor 101 controls the display device 107 to display an image indicating that the marking is not performed or the marking cannot be performed. After the processing in Act 10, the processor 101 returns to the processing in Act 2.

As described above, by executing the processing in Act 10, the computer with the processor 101 as the central part cooperates with the speaker 109 or the display device 107 to function as a notifying section.

If it is determined that the marking can be normally performed in Act 7, the processor 101 determines Yes and proceeds to the processing in Act 11.

In Act 11, the processor 101 controls the marking device 110 to set the parameters relating to the laser beam of the marking device 110 according to the parameters included in the commodity information received in Act 4. The processor 101 may control the display device 107 to display parameters set in the marking device 110.

If it is determined that the marking can be normally performed in Act 9, the processor 101 determines Yes and proceeds to the processing in Act 12.

In Act 12, the processor 101 controls the marking device 110 to set the parameters relating to the laser beam of the marking device 110 according to the material information included in the commodity information received in Act 4. The processor 101 may control the display device 107 to display parameters set in the marking device 110.

Through the above, by performing the processing in Act 11 or Act 12, the computer with the processor 101 as the central part cooperates with the marking device 110 to function as a setting section which sets the parameters relating to the laser beam.

After the processing in Act 11 or Act 12, the processor 101 proceeds to the processing in Act 13.

In Act 13, the processor 101 controls each section to notify notes. The notes include, for example, that the marking can be performed, that the laser beam is emitted, or that goggles to protect the eyes from the laser beam are required to be worn. Specifically, for example, the processor 101 controls the speaker 109 to output these notes by voice. For example, the processor 101 controls the display device 107 to display an image including these notes.

By executing the processing in Act 13, the computer with the processor 101 as the central part cooperates with the speaker 109 or the display device 107 to function as a notifying section.

In Act 14, the processor 101 determines whether or not an operation for instructing the start of the marking is performed. Specifically, for example, the processor 101 determines whether or not a button for instructing irradiation of the laser beam is operated. The button may be, for example, a physical button or the like or may be displayed on a touch panel. If the operation for instructing the start of marking is not performed, the processor 101 determines No in Act 14 and proceeds to the processing in Act 15.

In Act 15, the processor 101 determines whether or not an operation for instructing to start reading the commodity code is performed. If the operation for instructing to start reading the commodity code is not performed, the processor 101 determines No in Act 15 and returns to the processing in Act 14. Thus, the processor 101 repeats the processing in Act 14 and Act 15 until the operation for instructing the start of marking is performed, or an operation for instructing to start reading the commodity code is performed.

The operator of the marking apparatus 10 places the commodity at a position to which the laser beam is emitted from the marking device 110. Then, the operator operates the input device 108 to instruct the marking apparatus 10 to start the marking.

If the operation for instructing the start of the marking is performed in the standby state in Act 14 and Act 15, the processor 101 determines Yes in Act 14 and proceeds to the processing in Act 16.

In Act 16, the processor 101 determines the content to be marked. The content to be marked is a barcode containing the individual ID associated with the commodity to be marked. The processor 101 determines the individual ID as a unique ID for each commodity. The individual ID includes, for example, an identification number individually assigned to each of the JAN code and the marking apparatus 10, and a serial number. Alternatively, the processor 101 may request the server 20 to issue an individual ID and use the individual ID issued by the server 20. In this case, the server 20 that is requested to issue the individual ID issues a new individual ID which is not the same as the issued individual IDs. Then, the server 20 transmits the individual ID to the marking apparatus 10.

The marking content determined in Act 16 is an example of second information. The individual ID is an example of the second information. The individual ID is an example of identification information assigned to each object.

In Act 17, the processor 101 controls each unit section to notify the notes. For example, the note indicates that the irradiation of the laser beam is started. Specifically, the processor 101 controls the speaker 109 to output the note by voice. For example, the processor 101 controls the display device 107 to display an image including the note.

By executing the processing in Act 17, the computer with the processor 101 as the central part cooperates with the speaker 109 or the display device 107 to function as the notifying section.

In Act 18, the processor 101 controls the marking device 110 to irradiate the commodity with the laser beam corresponding to the parameters set in Act 12, thereby marking an image having the content determined in Act 16 on the commodity surface.

The image marked in Act 18 is an example of the second information.

In Act 19, the processor 101 generates a marking notification indicating that the marking is completed. The marking notification includes an individual ID marked in Act and the commodity code input in Act 2. The marking notification may include individual information to be associated with the individual ID. Then, the processor 101 controls the communication interface 105 to transmit the marking notification to the server 20. Under the control of the processor 101, the communication interface 105 transmits the marking notification to the server 20. The transmitted marking notification is received by the communication interface 25 of the server 20. After the processing in Act 19, the processor 101 returns to the processing in Act 14.

Meanwhile, if the marking notification is received in the standby state in Act 21 to Act 24 in FIG. 3, the processor 21 of the server 20 determines Yes in Act 22 and proceeds to the processing in Act 27.

In Act 27, the processor 21 updates the individual DB 242 based on the marking notification received in the standby state in Act 21 to Act 24. Specifically, the processor 21 stores the individual ID included in the marking notification in the individual DB 242 in association with the commodity code of the commodity specified by the individual ID. If the individual information is included in the marking notification, the processor 21 stores the individual information in the individual DB 242 in association with the individual ID. After the processing in Act 27, the processor 21 returns to the processing in Act 21.

Meanwhile, when a commodity having the same commodity code as the marked commodity is to be marked, the operator of the marking apparatus 10 performs the operation to instruct the start of marking in a state in which the commodity to be marked next is placed at the irradiation position of the laser beam. In response to this, the marking apparatus 10 performs the processing in Act 16 to Act 19 again. As described above, the operator of the marking apparatus 10 can mark the commodities having the same commodity code one after another.

The operator of the marking apparatus 10 performs an operation for instructing to start reading the commodity code if another type of commodity, i.e., a commodity with the different commodity code is required to be marked.

If the operation for instructing to start reading the commodity code is performed in the standby state in Act 14 and Act 15 in FIG. 2, the processor 101 determines Yes in Act 15 and returns to the processing in Act 2.

Next, the use of the marked information is described.

When the operator of the reading apparatus 30 wants to confirm the individual information of the commodity marked by the marking apparatus 10 or wants to update the individual information, the operator of the reading apparatus 30 operates the input device 38 to perform an operation for instructing the reading apparatus 30 to start reading the marked content.

In Act 31 in FIG. 4, the processor 31 of the reading apparatus 30 stands by until the operation for instructing to start reading the marked content is performed. If the operation for instructing to start reading the marked content is performed, the processor 31 determines Yes in Act 31 and proceeds to the processing in Act 32.

In Act 32, the processor 31 stands by until the marked content is read. Specifically, the operator of the reading apparatus 30 uses the scanner 36 to read the barcode marked on the commodity. As a result, the individual ID recorded in the barcode is read by the scanner 36, and then is input to the reading apparatus 30. If the marked content is read by the scanner 36, the processor 31 determines Yes in Act 32 and proceeds to the processing in Act 33.

In Act 33, the processor 31 determines whether or not the content read in Act 32 includes the individual ID. If the content read in Act 32 does not include the individual ID, the processor 31 determines No in Act 33 and proceeds to the processing in Act 34.

In Act 34, the processor 31 controls the display device to display the content read in Act 32. After the processing in Act 34, the processor 31 returns to the processing in Act 32.

Contrarily, if the content read in Act 32 contains the individual ID, the processor 31 determines Yes in Act 33 and proceeds to the processing in Act 35.

In Act 35, the processor 31 generates an individual information request. The individual information request includes the individual ID read in Act 32. The individual information request instructs transmission of the individual information associated with the individual ID. After generating the individual information request, the processor 31 controls the communication interface 35 to transmit the individual information request to the server 20. Under the control of the processor 31, the communication interface 35 transmits the individual information request to the server 20. The transmitted individual information request is received by the communication interface 25 of the server 20.

Meanwhile, if the individual information request is received in the standby state in Act 21 to Act 24 in FIG. 3, the processor 21 of the server 20 determines Yes in Act 23 and proceeds to the processing in Act 28.

In Act 28, the processor 21 refers to the individual DB 242 to acquire the individual information associated with the individual ID included in the individual information request received in the standby state in Act 21 to Act 24.

In Act 29, the processor 21 controls the communication interface 25 to transmit the individual information acquired in Act 28 to the reading apparatus 30. Under the control of the processor 21, the communication interface 25 transmits the individual information to the reading apparatus 30. The transmitted individual information is received by the communication interface 35 of the reading apparatus 30. The processor 21 returns to the processing in Act 21 after the processing in Act 29.

Meanwhile, in Act 36 in FIG. 4, the processor 31 of the reading apparatus 30 stands by until the individual information is received by the communication interface 35. If the individual information is received, the processor 31 determines Yes in Act 36 and proceeds to the processing in Act 37.

In Act 37, the processor 31 controls each section to inform the contents included in the individual information received in the Act 36. For example, the processor 31 controls the display device 37 to display the content of the individual information.

As described above, the operator of the reading apparatus 30 can confirm the content of the individual information associated with the individual ID by using the reading apparatus 30.

In Act 38, the processor 31 determines whether to update the individual information. The processor 31 determines whether to update the individual information, for example, as follows. For example, the reading apparatus 30 may set whether to update the individual information. For example, when the setting of the reading apparatus 30 is to update the individual information, the processor 31 determines that the individual information is to be updated. If the individual information is not to be updated, the processor 31 determines No in Act 38 and returns to the processing in Act 32. Contrarily, if the individual information is to be updated, the processor 31 determines Yes in Act 38 and proceeds to the processing in Act 39.

In Act 39, the processor 31 generates an update request. The update request includes the individual ID input in Act 32 and the update content. The update request instructs to update the individual information. After generating the update request, the processor 31 controls the communication interface 35 to transmit the update request to the server 20. Under the control of the processor 31, the communication interface 35 transmits the update request to the server 20. The transmitted update request is received by the communication interface 25 of the server 20. After the processing in Act 39, the processor 31 returns to the processing in Act 32.

The update content is input to the reading apparatus 30 as follows, for example. For example, the reading apparatus 30 may have a function of inputting update content. The input is, for example, an operation input performed by the operator of the reading apparatus 30 or an input of information transmitted from another device. The individual information included in the update request is, for example, the individual information input by the above function.

Meanwhile, if the update request is received in the standby state in Act 21 to Act 24 in FIG. 3, the processor 21 of the server 20 determines Yes in Act 24 and proceeds to the processing in Act 30.

In Act 30, the processor 21 updates the individual DB 242 and associates the individual ID included in the update request received in the standby state in Act 21 to Act 24 with the individual information included in the update request. After the processing in Act 30, the processor 21 returns to the processing in Act 21.

As described above, the operator of the reading apparatus 30 can update the individual information associated with the individual ID by using the reading apparatus 30.

According to the marking system 1 of the first embodiment, the server 20 stores the marking information in association with the commodity code in the commodity DB 241. The marking apparatus 10 reads the commodity code from the barcode attached to a commodity or a package of the commodity. The marking apparatus 10 then acquires the marking information associated with the commodity code from the commodity DB 241 using the commodity code. Furthermore, the marking apparatus 10 automatically sets the laser beam from the marking device 110 according to the acquired marking information. As described above, since the laser beam is set only by reading the barcode, the operator of the marking apparatus 10 can use the marking apparatus 10 only by performing a simple operation.

According to the marking system 1 of the first embodiment, an image marked on the commodity by the marking apparatus 10 can specify the individual information of the commodity. Therefore, the marking system 1 of the first embodiment can realize traceability that enables recording, management, browsing, etc. of the individual information for each commodity. When compared with a case in which an RFID (Radio Frequency Identifier) tag is used, the marking system 1 does not need to attach a tag to the commodity, thereby realizing the traceability at the lower cost. Furthermore, when compared with the case of using the RFID tag, the marking system 1 can directly mark fresh foods such as fruits because there is no need to attach the tag to the commodity. For this reason, the traceability of each commodity becomes easy. In the case of directly marking fresh food such as fruits, if the parameters set in the marking device 110 are appropriate, it is possible to perform marking while only the skin thereof is affected by the laser beam.

According to the marking system 1 of the first embodiment, the marking apparatus 10 makes various notifications in response to input of the commodity code. Thus, the operator of the marking apparatus 10 can easily understand the current situation of the marking apparatus 10. The marking apparatus 10 notifies various notes. Thus, it is possible to improve the safety of the operator of the marking apparatus 10.

The commodity sold in the retail store has a barcode including a code such as a JAN code for identifying the commodity. However, the JAN code is assigned depending on the type of commodity, and cannot be used for identifying an individual commodity. Depending on a retail store or the like, a barcode seal including an identification code that can be individually identified may be affixed to a commodity. However, there is a possibility that the affixed barcode seal naturally peels off. The affixed barcode seal may be replaced by a customer for a fraudulent purpose or the like. Contrarily, unlike the barcode seal, the marking using the laser marker cannot be peeled off and replaced.

Second Embodiment

A marking system according to the second embodiment is described below.

Since the circuit configuration of main portions of the marking system 1 according to the second embodiment is the same as that of the first embodiment shown in FIG. 1, the description thereof is omitted.

The marking apparatus 10 of the second embodiment is typically a POS terminal.

The reading apparatus 30 of the second embodiment is typically a POS terminal.

The marking apparatus 10 and the reading apparatus 30 may be the same apparatus.

The auxiliary storage device 104 of the second embodiment stores a commodity DB. The marking apparatus 10 acquires the commodity DB from the server 20, for example.

Figure 5:
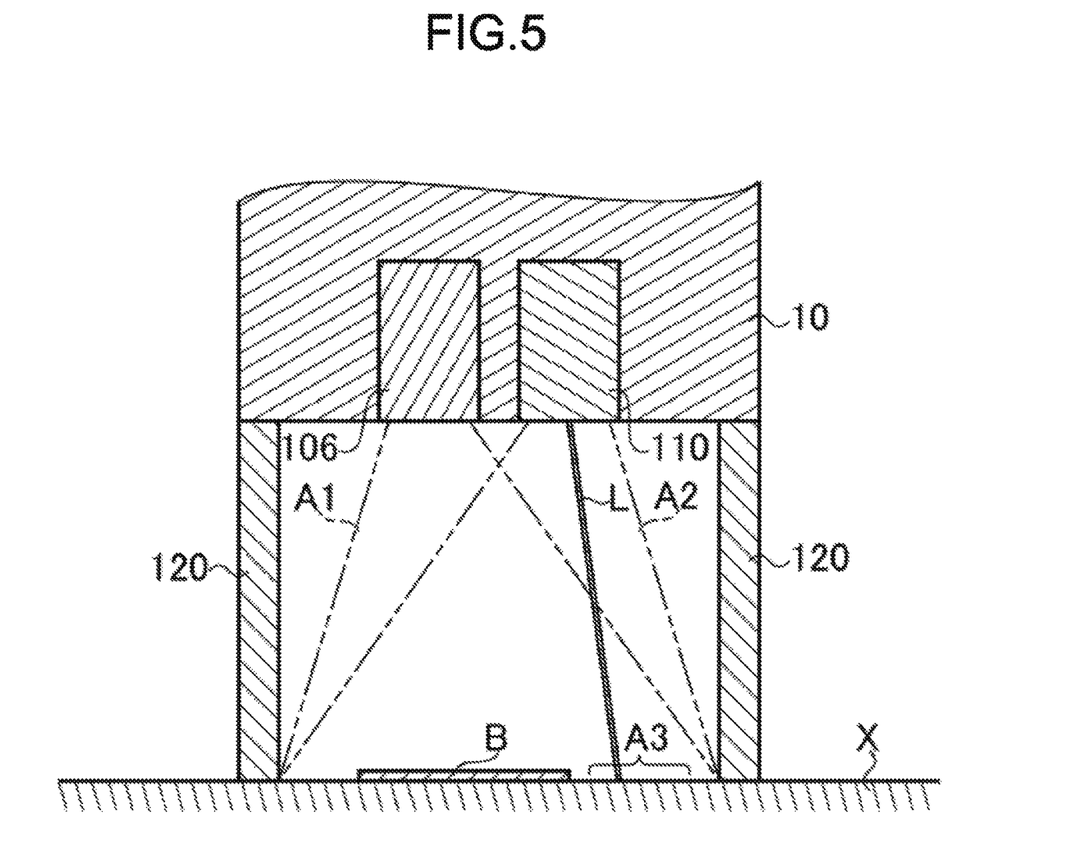
FIG. 5 is a cross-sectional view schematically illustrating a marking apparatus according to the second embodiment.

In the marking apparatus 10 of the second embodiment, as shown in FIG. 5, a scanner 106 and a marking device 110 are arranged side by side. FIG. 5 is a cross-sectional view schematically illustrating the marking apparatus 10 according to the second embodiment. FIG. 5 is a cross-sectional view schematically illustrating a side view of a part of the marking apparatus 10 and an object X to which a barcode B is attached. For example, the barcode B is attached to the object X as a seal. Alternatively, the barcode B is printed on the object X, for example.

The scanner 106 can read the barcode B within a reading range A1. Then, the marking device 110 can mark the object X in an irradiation range A2 by irradiating the object X with a laser beam L. Since the scanner 106 and the marking device 110 are provided side by side as described above, it is possible to mark the object X in a range A3 in the vicinity of the barcode B read by the scanner 106. The vicinity of the barcode B is, for example, within a certain distance from the barcode B.

In the marking apparatus 10 shown in FIG. 5, the range A1 and the range A2 indicate the same range on the object X, the range A1 and the range A2 does not need to be the same range. The range A1 and the range A2 may not overlap with each other. The range A2 may be any range as long as it includes at least a range within which the object in the range A3 in the vicinity of the barcode B read by the scanner 106 can be marked.

The marking apparatus 10 may be provided with a guide 120. The guide 120 is provided to keep a distance between the marking apparatus 10 and the object X constant. With the guide 120, the operator of the marking apparatus 10 can easily understand whether the barcode B is within the range A1 and whether the position to be marked is within the range A2.

Figure 6:
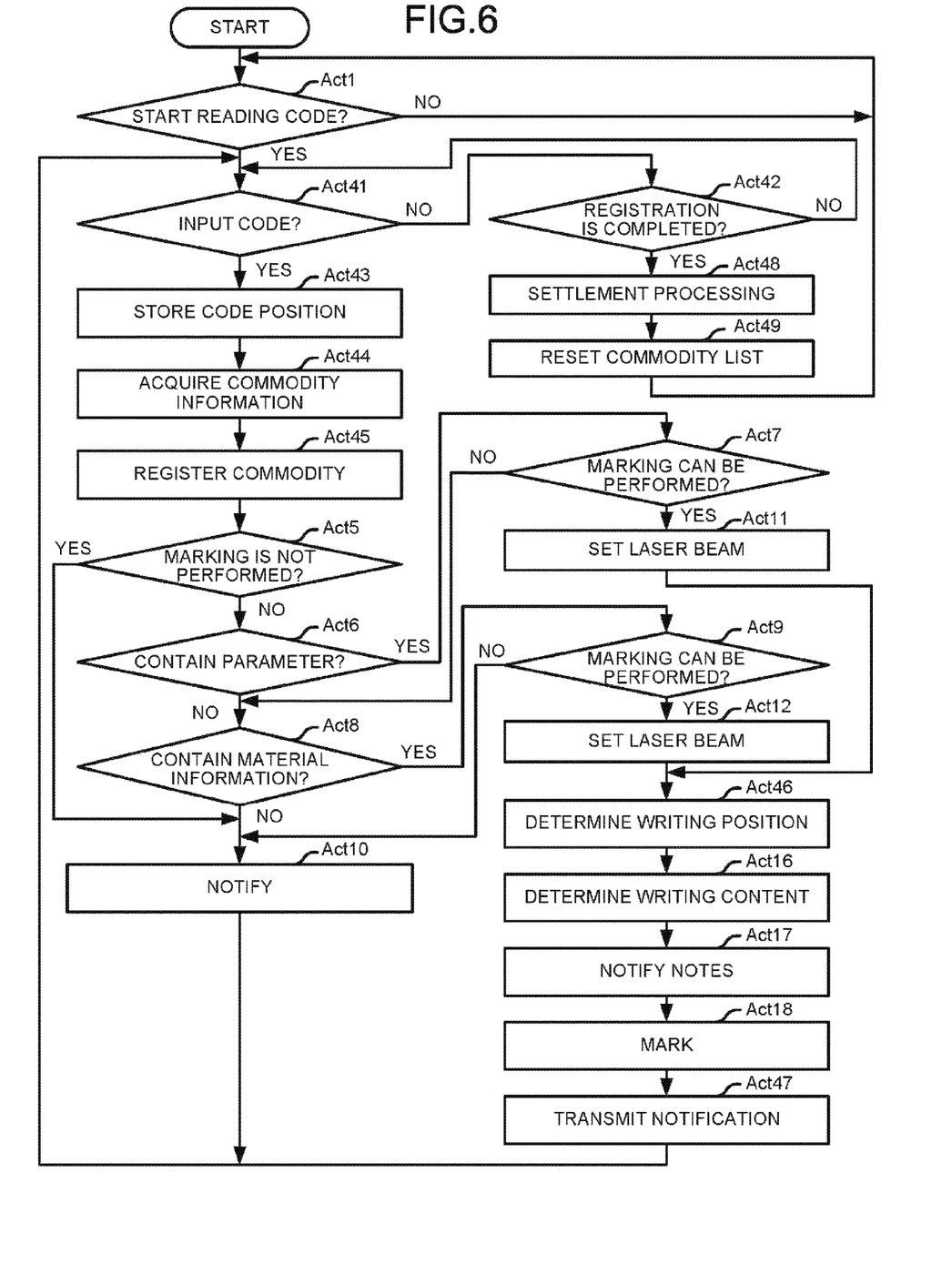
FIG. 6 is a flowchart depicting a processing executed by a processor of the marking apparatus in FIG. 1 according to the second embodiment.
Figure 7:
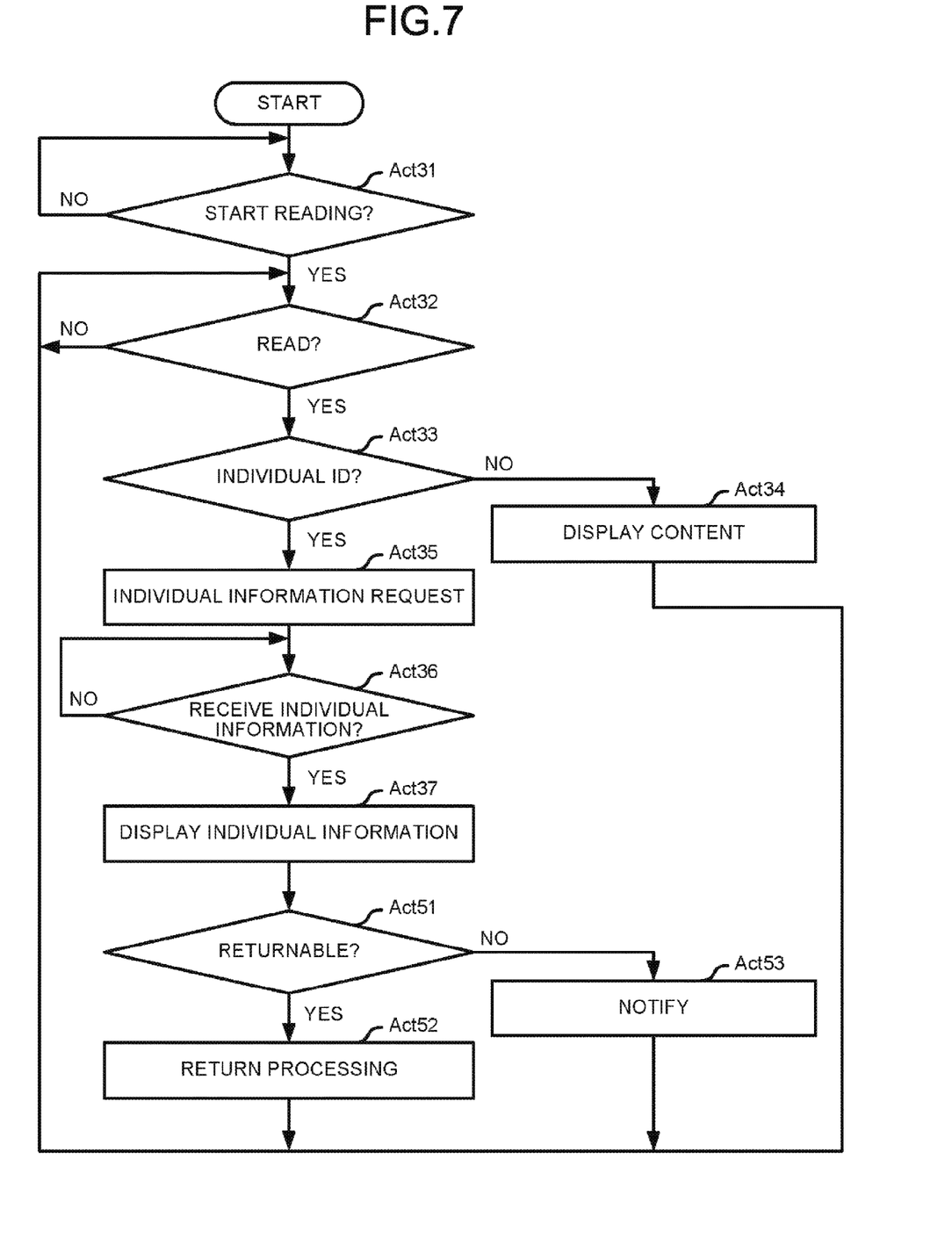
FIG. 7 is a flowchart depicting a processing executed by a processor of a reading apparatus in FIG. 1 according to the second embodiment.

The operation of the marking system 1 according to the second embodiment is described with reference to FIG. 3, FIG. 6 and FIG. 7. The marking apparatus 10 performs the processing shown in FIG. 6 instead of the processing shown in FIG. 2 of the first embodiment. FIG. 6 is a flowchart depicting a processing performed by the processor 101 of the marking apparatus 10. The processor 101 executes the processing by executing a program stored in the ROM 102 or the auxiliary storage device 104. The reading apparatus 30 performs the processing shown in FIG. 7 instead of the processing shown in FIG. 4 of the first embodiment. FIG. 7 is a flowchart depicting a processing performed by the processor 31 of the reading apparatus 30. The processor 31 executes the processing by executing a program stored in the ROM 32 or the auxiliary storage device 34.

In the second embodiment, If it is determined Yes in Act 1, the processor 101 proceeds to the processing in Act 41.

In Act 41, the processor 101 determines whether or not the commodity code is input. The commodity code is input to the marking apparatus 10 as an example as shown below. The operator of the marking apparatus 10 uses the scanner 106 to read the barcode attached to the commodity. As a result, the commodity code recorded in the barcode is input to the marking apparatus 10. If the commodity code is not input, the processor 101 determines No in Act 41 and proceeds to the processing in Act 42.

In Act 42, the processor 101 determines whether or not an operation for completing the registration of the commodity is performed. An operation of the processor 101 when the operation for instructing to complete the registration in a state in which the commodity is not registered may be determined by a designer of the program of the processor 101. For example, the processor 101 may ignore an operation for instructing to complete the registration. Alternatively, in a state in which the commodity is not registered, the processor 101 may prevent the operation for instructing to complete the registration from being operated. If the operation for instructing to complete the registration is not performed, the processor 101 determines No in Act 42 and returns to the processing in Act 41. Thus, the processor 101 repeats the processing in Act 41 and Act 42 until the commodity code is input or the operation for completing the registration of the commodity is performed.

If the commodity code is input in the standby state in Act 41 and Act 42, the processor 101 determines Yes in Act 41 and proceeds to the processing in Act 43.

In Act 43, the processor 101 stores the information indicating a position of the read barcode in the RAM 103.

The processor 101 determines the position of the barcode based on the image read by the scanner 106.

In Act 44, the processor 101 refers to the commodity DB stored in the auxiliary storage device 104 and obtains commodity information from the commodity code input in Act 41.

By the processing in Act 44, the processor 101 acquires the commodity information. Therefore, the computer with the processor 101 as the central part functions as the acquiring section for acquiring the first information.

In Act 45, the processor 101 associates the commodity code read in Act 41 with the commodity information acquired in Act 44, and adds them to a commodity list stored in the RAM 103 or the auxiliary storage device 104. After the processing in Act 45, the processor 101 proceeds to the processing in Act 5.

In Act 5 of the second embodiment, the processor 101 performs the processing based on the commodity information acquired in Act 44 instead of the commodity information received in Act 4. Then, if it is determined Yes in Act 5, the processor 101 proceeds to the processing in Act 10.

In Act 5 of the second embodiment, the processor 101 performs the processing based on the commodity information acquired in Act 44 instead of the commodity information received in Act 4. After the processing in Act 12, the processor 101 proceeds to the processing in Act 46.

In Act 46, the processor 101 determines a position to be marked. The position to be marked is, for example, in the vicinity of the position of the barcode stored in Act 43. It is preferable that the position to be marked does not overlap with the barcode. If the barcode is a seal, the position to be marked preferably does not overlap with the seal. For this reason, the processor 101 may store the position of the seal in the RAM 103 in Act 43. For example, the processor 101 determines the position of the seal from an image read by the scanner 106. After the processing in Act 46, the processor 101 proceeds to the processing in Act 16 to Act 18. After the processing in Act 18, the processor 101 proceeds to the processing in Act 47.

In Act 47, the processor 101 generates a marking notification. The marking notification includes the same individual ID as that included in the marking content. The marking notification includes sales store and sales date and time. The sales store indicates a retail store where the commodity is sold, and is, for example, information for specifying the retail store where the marking apparatus 10 is installed. The sales date and time indicates a date and time at which commodity is sold, and is, for example, the date and time at which any one of the processing in Act 41 to Act 47 is performed. Then, the processor 101 controls the communication interface 105 to transmit the generated marking notification to the reading apparatus 30. Under the control of the processor 101, the communication interface 105 transmits the marking notification to the reading apparatus 30. The transmitted marking notification is received by the communication interface 35 of the reading apparatus 30. After the processing in Act 47, the processor 101 returns to the processing in Act 41. The processor 101 returns to the processing in Act 41 even after the processing in Act 10.

Meanwhile, the server 20 receiving the marking notification stores the sales store and the sales date and time as the individual information in the individual DB 242 in association with the individual ID in the processing in Act 27 in FIG. 3.

Meanwhile, if the operation for completing the registration of the commodity is performed in the standby state in Act 41 and Act 42 in FIG. 6, the processor 101 determines Yes in Act 42 and proceeds to the processing in Act 48.

In Act 48, the processor 101 performs processing relating to checkout based on the commodity code and the commodity information stored in the commodity list.

In Act 49, the processor 101 resets the commodity list stored in the RAM 103 or the auxiliary storage device 104. Specifically, the processor 101 sets a state of the commodity list to a state in which no commodity code is stored in the commodity list. After the processing in Act 49, the processor 101 returns to the processing in Act 1.

An example of utilization of the marked information is described in a case in which a customer who purchased a commodity that is registered and marked by the marking apparatus 10 returns the commodity.

The store clerk who receives a returned commodity from the customer uses the reading apparatus 30 to read the information marked by the marking apparatus 10.

Like the first embodiment, the reading apparatus 30 performs the processing in Act 31 to Act 37 in FIG. 7, and then proceeds to the processing in Act 51.

In Act 51, the processor 31 determines whether or not the commodity is a returnable commodity based on the individual information received in Act 36. For example, the individual information includes a commodity code, a purchase store and a purchase date and time. For example, the processor 31 determines whether or not the purchase store included in the individual information is the same as the store where the reading apparatus 30 is installed. Then, for example, if the stores are not the same, the processor 31 determines that the commodity is not returnable commodity. For example, the processor 31 determines whether time elapsed from the purchase date and time included in the individual information to the current date and time does not exceed the number of days within which the commodity is returnable. Then, the processor 31 determines that the commodity is not a returnable commodity if the elapsed time exceeds the number of days within which the commodity is returnable. If the processor 31 determines that the commodity is a returnable commodity, the processor 31 determines Yes in Act 51 and proceeds to the processing in Act 52.

By executing the processing in Act 51, the computer with the processor 31 as the central part functions as a determining section for determining that the object is standard.

In Act 52, the processor 31 performs a processing relating to a return commodity. The processing relating to the return commodity is a well-known processing, and thus, the detailed description is omitted. After the processing in Act 52, the processor 31 returns to the processing in Act 32.

Meanwhile, if it is determined that the commodity is not a returnable commodity, the processor 31 determines No in Act 51 and proceeds to the processing in Act 53.

In Act 53, the processor 31 controls each section to notify that the commodity is not a returnable commodity. For example, the processor 31 controls the display device 37 to display an image indicating that the commodity is not a returnable commodity. The processor 31 may control the speaker to output a sound indicating that the commodity is not a returnable commodity. After the processing in Act 53, the processor 31 returns to the processing in Act 32.

According to the marking system 1 of the second embodiment, the marking apparatus 10 is provided with the scanner 106 and the marking device 110 arranged side by side. As a result, the marking apparatus 10 can perform marking as it is after inputting the commodity code. Therefore, the operator of the marking apparatus 10 can perform the marking using the laser beam by merely performing an operation for inputting the commodity code. Therefore, it is possible to reduce troubles in the operation for the operator of the marking apparatus 10.

According to the marking system 1 of the second embodiment, if a barcode is read to perform purchase registration on the commodity, the marking apparatus 10 marks the commodity. The reading apparatus 30 reads the mark of the commodity when the commodity is returned. Thus, the reading apparatus 30 can determine whether the commodity is a returnable commodity. The store clerk can know whether the commodity is a returnable commodity according to the mark.

The marking apparatus 10 of the second embodiment stores the commodity DB and acquires commodity information from the commodity DB. Therefore, the marking apparatus 10 of the second embodiment can acquire the commodity information in a shorter time when compared with a case of acquiring the commodity information from the server 20. Therefore, in the marking apparatus 10 of the second embodiment, a time since the commodity code is read by the scanner 106 until the marking is performed is short.

The first and second embodiments described above can also be modified as follows.

In the first embodiment and the second embodiment, the marking apparatus 10 specifies the type of the commodity according to the commodity code. However, the marking apparatus 10 may specify the type of the commodity by image recognition. In this case, the marking apparatus 10 includes a camera as the scanner 106. The marking apparatus 10 then specifies the type of the commodity based on an image captured by the camera. Furthermore, the marking apparatus 10 transmits a commodity information request including the specified type of the commodity instead of the commodity code to the server 20 in Act 3. In response to this, the server 20 acquires the commodity information associated with the type of the commodity from the commodity DB and transmits it to the marking apparatus 10.

Alternatively, the marking apparatus 10 may transmit an image captured by the camera instead of the commodity code in Act 3. Then, the server 20 may specify the type of the commodity based on the image.

The commodity code may be input to the marking apparatus 10 by an operation performed by the operator of the marking apparatus 10. For example, the operator of the marking apparatus 10 operates the input device 108 to input the commodity code of the commodity to be marked. As a result, the commodity code is input to the marking apparatus 10.

Alternatively, the operator of the marking apparatus 10 may operate a button associated with the commodity to be marked. The button is included in the input device 108. The button may be displayed on the touch panel. For example, the operator of the marking apparatus 10 operates a button displayed in association with an apple if he/she wants to mark the apple. By this operation, the commodity code of the commodity associated with the button is input to the marking apparatus 10.

The marking apparatus 10 may not execute the processing in Act 5. In this case, for example, the processor 101 skips the processing in Act 5 and proceeds to the processing in Act 6.

The marking apparatus 10 may not execute the processing in Act 6, Act 7 and Act 11. In this case, for example, the processor 101 skips the processing in Act 6 and proceeds to the processing in Act 8.

The marking apparatus 10 may not execute the processing in Act 8, Act 9 and Act 12. In this case, for example, the processor 101 skips the processing in Act 8 and proceeds to the processing in Act 10.

The marking apparatus 10 may not execute the processing in Act 7. In this case, for example, the processor 101 skips the processing in Act 7 and proceeds to the processing in Act 11. In this case, for example, it is a rule that the parameters included in the marking information are limited to being within a range that can be set by the parameters of the marking device 110.

In the first embodiment and the second embodiment, the marking apparatus 10 marks a barcode containing the individual ID. However, the marking apparatus 10 may mark a barcode containing the individual information. By doing this, the reading apparatus 30 can acquire the individual information from the barcode without acquiring the individual information from the server 20.

The marking apparatus 10 of the second embodiment may mark a barcode including the sales store and the sales date and time. In this case, the reading apparatus 30 may determine whether or not the commodity is a returnable commodity based on the sales store and the sales date and time included in the barcode. The operator of the reading apparatus 30 may also determine whether or not the commodity is a returnable commodity by checking the sales store and the sales date and time displayed on the display device 37.

The marking apparatus 10 of the first embodiment may store the commodity DB as in the second embodiment. Then, the marking apparatus 10 may acquire the commodity information from the commodity DB.

The marking apparatus 10 of the second embodiment may acquire the commodity information from the server 20 as in the first embodiment.

In the marking apparatus 10 of the first embodiment, the scanner 106 and the marking device 110 may be provided side by side as in the second embodiment. The marking apparatus 10 may also start the marking without waiting for input of the operation for instructing the start of marking.

As in the first embodiment, the marking apparatus 10 of the second embodiment may start the marking after the operation for instructing the start of marking is performed.

In the marking apparatus 10 of the first embodiment, as in the second embodiment, the scanner 106 and the marking device 110 may be provided side by side. As in the second embodiment, the marking apparatus 10 of the first embodiment may perform marking without waiting for the operation for instructing the start of marking. For example, after the processing in Act 12, the processor 101 proceeds to the processing in Act 16 without performing the processing in Act 13 and Act 14. Then, after the processing in Act 19, the processor 101 returns to the processing in Act 2.

As in the first embodiment, the marking apparatus 10 of the second embodiment may perform marking after the operation for instructing the start of marking is input.

The commodity information may be recorded in the barcode read by the scanner 106 of the marking apparatus 10. In this case, the marking apparatus 10 can acquire the commodity information from the barcode without acquiring the commodity information from the server 20.

The marking information may be recorded in the barcode read by the scanner 106 of the marking apparatus 10. In this case, the marking apparatus 10 can acquire the marking information from the barcode without acquiring the marking information from the server 20.

What the marking apparatus 10 reads with the scanner 106 is not limited to the barcode, but may be characters, a symbol, or other images, for example.

The content marked by the marking apparatus 10 is not limited to a barcode, but may be characters, a symbol or other images, for example.

The marking apparatus 10 of the second embodiment may mark different characters or symbols for different stores. By referring to the mark, the store clerk can grasp the store where the commodity is purchased without using the reading apparatus 30. In this way, the store clerk can determine whether or not the commodity is a returnable commodity. The reading apparatus 30 may read these characters or symbols to determine whether the commodity is a returnable commodity.

In the marking system 1 of the second embodiment, the reading apparatus 30 determines whether or not the commodity is a returnable commodity using the barcode marked by the marking apparatus 10 at the time of performing commodity purchase registration. However, whether the commodity is a returnable commodity may be determined using the barcode marked by the marking apparatus 10 at a timing different from the time at which the purchase registration of the commodity is performed. In this case, the POS terminal (the reading apparatus 30) reads the barcode marked by the marking apparatus 10 at the time of performing purchase registration of the commodity. Then, the POS terminal (the reading apparatus 30) transmits an update request to the server 20 like the reading apparatus 30 of the first embodiment. The update request includes, as the individual information, a purchase store and a purchase date and time. In this way, the reading apparatus 30 can determine whether or not the commodity is a returnable commodity.

The marking system 1 of the second embodiment determines whether or not the commodity marked by the marking apparatus 10 is a returnable commodity. However, the marking system 1 may determine whether the commodity is standard according to other items. For example, the reading apparatus 30 determines whether a commodity sold in another store is brought in. Specifically, the processor 31 of the reading apparatus 30 determines whether or not the sales store included in the acquired individual information is the same as the store where the reading apparatus 30 is installed. Then, the reading apparatus 30 notifies the determination result. In this case, the marking by the marking apparatus 10 is made before the start of the sales.

By performing the above determination processing, the computer with the processor 31 as the central part functions as a determining section for determining that the object is standard.

The object to be marked by the marking apparatus 10 is not limited to the commodity. The object to be marked by the marking apparatus 10 is, for example, a component, a furnishing or equipment. The marking system 1 can manage an individual object such as the component, the furnishing, or the equipment by marking the component, the furnishing, or the equipment. In this case, in place of the commodity DB 241, the server 20 stores an object database for recording information relating to the object such as the component, the furnishing, or the equipment. The object database records an ID assigned to each type of the object such as the component, the furnishing, or the equipment, and the marking information for each type of object such as the component, the furnishing, or the equipment in an associated manner. The individual DB 242 stores various kinds of information relating to the object such as the component, the furnishing, or the equipment.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A marking apparatus, comprising:
   an acquiring component configured to acquire first information associated with an object;
   a setting component configured to set parameters of a laser beam based on the first information;
   a marking component configured to irradiate the object with the laser beam based on the parameters set by the setting component to mark second information on the object; and
   a determining component configured to determine whether the object is standard based on the second information read by a reading component from the mark of the object.

2. The marking apparatus according to claim 1, further comprising:
   a notifying component configured to notify notes relating to irradiation of the laser beam when the first information is acquired by the acquiring component.

3. The marking apparatus according to claim 1, wherein the second information is identification information assigned to each object.

4. The marking apparatus according to claim 2, wherein the second information is identification information assigned to each object.

5. The marking apparatus according to claim 1, further comprising:
   a control component configured to control the marking component to determine whether or not marking is performed based on the first information and perform the marking if the marking is determined to be performed.

6. The marking apparatus according to claim 1, wherein the first information is comprised in a barcode.

7. The marking apparatus according to claim 1, wherein the parameters of a laser beam comprise one or more of irradiation time, a resolution of the image to be marked, a size of the image to be marked, a number of times of irradiation, focal length, type of the laser beam, and a wavelength of the laser beam.

8. A marking system comprising a marking apparatus and a reading apparatus, the marking apparatus comprising:
   an acquiring component configured to acquire first information associated with an object;
   a setting component configured to set parameters of a laser beam based on the first information; and
   a marking component configured to irradiate the object with the laser beam based on the parameters set by the setting component to mark second information on the object, and
   the reading apparatus comprising:
   a determining component configured to determine whether the object is standard based on the second information read by a reading component from the mark of the object.

9. The marking system according to claim 8, further comprising:
a notifying component configured to notify notes relating to irradiation of the laser beam when the first information is acquired by the acquiring component.

10. The marking system according to claim 8, wherein the second information is identification information assigned to each object.

11. The marking system according to claim 9, wherein the second information is identification information assigned to each object.

12. The marking system according to claim 8, further comprising:
a control component configured to control the marking component to determine whether or not marking is performed based on the first information and perform the marking if the marking is determined to be performed.

13. The marking system according to claim 8, wherein the first information is comprised in a barcode.

14. The marking system according to claim 8, wherein the parameters of a laser beam comprise one or more of irradiation time, a resolution of the image to be marked, a size of the image to be marked, a number of times of irradiation, focal length, type of the laser beam, and a wavelength of the laser beam.

15. A laser marking method, comprising:
acquiring first information associated with an object;
setting parameters of a laser beam based on the first information;
irradiating the object with the laser beam based on the parameters set by the setting component to mark second information on the object; and
determining whether the object is standard based on the second information read by a reading component from the mark of the object.

16. The laser marking method according to claim 15, further comprising:
notifying notes relating to irradiation of the laser beam when the first information is acquired.

17. The laser marking method according to claim 15, wherein
the second information is identification information assigned to each object.

18. The laser marking method according to claim 15, further comprising:
controlling irradiation to determine whether or not irradiating is performed based on the first information and performing the irradiation if marking is determined to be performed.

19. The laser marking method according to claim 15, wherein
the first information is comprised in a barcode.

20. The laser marking method according to claim 15, wherein
the parameters of a laser beam comprise one or more of irradiation time, a resolution of the image to be marked, a size of the image to be marked, a number of times of irradiation, focal length, type of the laser beam, and a wavelength of the laser beam.

* * * * *